United States Patent
Nae et al.

[11] Patent Number: 5,112,400
[45] Date of Patent: May 12, 1992

[54] CLAY THICKENER FOR USE IN WATER-BASED SYSTEMS AND JOINT COMPOOUNDS CONTAINING SUCH COMPOSITIONS

[75] Inventors: Hemi N. Nae, Princeton; Wei M. Cheng, Piscataway; Michael A. DeSesa, Fair Haven, all of N.J.

[73] Assignee: Rheox, Inc., Hightstown, N.J.

[21] Appl. No.: 489,195

[22] Filed: Mar. 6, 1990

[51] Int. Cl.⁵ .......................... C09D 101/02
[52] U.S. Cl. ................... 106/197.1; 106/203; 106/204
[58] Field of Search ............ 106/197.1, 197.2, 203, 106/204

[56] References Cited

U.S. PATENT DOCUMENTS

| | | | |
|---|---|---|---|
| Re. 29,753 | 9/1978 | Williams | 106/197.2 |
| 2,802,303 | 8/1957 | Weeks. | |
| 3,852,085 | 12/1974 | Vurlicer | 106/197.2 |
| 3,891,582 | 6/1975 | Desmarais | 106/141 |
| 4,558,079 | 12/1985 | Desmarais | 106/197.1 |
| 4,670,164 | 6/1987 | Watson et al. | 106/197.1 |

Primary Examiner—Theodore Morris
Assistant Examiner—David M. Brunsman
Attorney, Agent, or Firm—Burns, Doane, Swecker & Mathis

[57] ABSTRACT

The present invention relates to a thickener composition comprising clay deposits and modified cellulose. It has now been discovered that a combination of a clay deposit and a modified cellulosic material provides thickening in water-based systems and particularly, in joint compound formulations. The composition shows a surprising thickening effect when added to water-based systems which would not be expected from the performance of these compounds individually as thickeners.

17 Claims, 2 Drawing Sheets

CLAY THICKENER FOR USE IN WATER-BASED SYSTEMS AND JOINT COMPOOUNDS CONTAINING SUCH COMPOSITIONS

FEILD OF THE INVENTION

The present invention relates to thickener compositions useful in joint compound and water-based coating formulations.

BACKGROUND OF THE INVENTION

Natural and synthetic thickeners are readily available and widely used in the art. It is well known that such thickeners, or as they are otherwise called, rheological additives, impart higher viscosity to solvent systems or water-based systems depending on the additive. Rheological additives generally are present only in small amounts, for example from 0.1% to 5%. Among these rheological additives are organoclays, fumed silica and organic and polymeric thickeners. Among the polymeric rheological additives are guar gum, tragacanth gum, pectin, xanthan and alginate (natural), hydroxyethyl cellulose, carboxymethyl cellulose, hydroxypropylmethyl cellulose, methyl cellulose (modified cellulosics) and polymers or copolymers of ethylenically unsaturated carboxylic acids and their derivatives, such as acrylic acid and acrylamide. The latter are ionic in nature and it has been shown that they may be used as flocculating and suspending agents for clay particles in water. These rheological additives are described in U.S. Pat. No. 4,738,726 issued to Pratt et.al., and Van der Watt and Bodman in *Clay and Caly Materials*, Volume 9, page 568 (1960).

Clay minerals are a group of minerals essentially composed of hydrated aluminum silicates with magnesium or iron proxying wholly or in part for the aluminum. Among these are montmorillonite, kaolin, illite, saponite, bentonite, hectorite, beidellite, stevensite, attapulgite and sepiolite. These minerals are described in *Applied Clay Mineralogy*, R. E. Grim, McGraw Hill, NY (1962).

One important type of clay mineral is hectorite, which is represented by the formula $[(Mg_{6-x}Li_x)Si_8O_{20}(OH)_{4-f}F_f]x\ R^+$ wherein $0.57 \pm x \pm 1.15$, $f \pm 4$ and R is selected from the group consisting of Na, Li, NH$_4$ and mixtures thereof, which is obtained from various deposits. Hectorite deposits typically contain about 52% hectorite by weiqht, the other components being mainly calcite and dolomite and sometimes feldspar. Generally, the deposits are not used in the raw form since the impurities are believed to hinder the usefulness of the clay. For example, organoclays are typically produced by first removing the impurities and then reacting the purified clay to produce the organoclay. Hectorite clay which has been beneficiated, or treated, to improve the properties contains about 98% hectorite and requires several costly processing steps such as preparation of a water slurry, centrifugation and then separation of the purified clay, to convert the untreated clay deposits to concentrated or purified hectorite. Similarly, bentonite deposits contain about 5-8% quartz and it requires costly processing to convert bentonite deposits to the beneficiated form.

Thickeners and clay minerals often are combined in formulations for various products. For example, U.S. Pat. No. 4,657,943, issued to Wietsma, describes a thickening agent useful in textile padding and oil drilling muds containing an acrylate polymer and an aluminum silicate clay, montmorillonite clay or bentonite which shows a synergistic effect. The thickening agent has improved resistance under alkaline conditions and exhibits a synerqistic effect in water. However, the clays used in the thickening agent are chemically treated before being added to the other ingredients, which adds expense and complexity to the manufacture of these compositions.

Thickeners are used in a host of products such as paints, varnishes, enamels, waxes, oil drilling fluids, inks, adhesives, sealants, cosmetics, paper coatings, textile backings, bath emulsion systems, cleaners and polishers and detergents. One important use of thickeners is in joint compounds which are used extensively in the construction industry. The construction industry uses joint compounds and gypsum wallboard to construct walls and/or ceilings. Walls made in this method are constructed by fixing the panels to studs, and filling and coating the joints with a specially prepared material called joint compound. The process may include the application of a first coating, which when dried, is coated by a second joint compound layer. This layer may be sanded and a third layer may be applied and conventionally finished. A variety of joint compounds are used according to the various applications such as dry grade, taping grade, topping grade, all-purpose grade, ready mix grade and the like. Joint compounds typically are prepared in water-based solutions.

While joint compounds may contain a variety of compounds, fillers, binders and thickeners typically will be present. In U.S. Pat. No. RE29,753, issued to Williams, cellulosic materials and clay minerals are included in a joint compound formulation wherein the thickeners are listed as hydroxypropylmethyl cellulose, hydroxyethyl cellulose, alginates and sodium carboxymethylcellulose. Attapulgite clay is listed in the '753 patent as a non-leveling agent, while a modified clay composition is described as an anti-slip agent useful in the joint compound.

The modified clay composition mentioned in the '753 patent is named as Bentone LT, from NL Industries. The clay composition of Bentone LT is 50% spray-dried, refined or purified hectorite and 50% cellulosic materials. Bentone LT, a clay gellant, is described as a rheological agent in Davidson et.al., Paint and Varnish Production, July 1971. While this composition may be used as a rheological agent, it is expensive due to the treatment steps required to refine the hectorite.

In U.S. Pat. No. 4,558,079, issued to Desmarais, hydrophobically modified cellulosic materials were used as thickeners for water-based joint compounds. The joint compounds described also contain a resinous binder, mica and a clay compound. The hydrophobically modified cellulosic materials used as the thickener were chosen because they have less tendency to adsorb on the surface of clays. The clays used in the joint compounds described in the '079 patent are used to prevent sag. The thickeners described in the '079 patent, which are organic compounds, are costly due to various chemical processing steps and due to the use of the cellulosic thickeners as the only thickener in the joint compound.

U.S. Pat. No. 4,670,164, issued to Watson et.al., describes a thickening agent containing hydroxyethyl cellulose and an organoclay, along with a hydrocarbon. In addition to the requirement that the clay be treated with an organic compound, the patent describes adding an alcohol/ketone solution and the hydrocarbon in order to disperse the combination of hydroxyethyl cellulose and an organoclay to achieve the required viscosity in water. This thickening agent requires extra treatment of the clay which makes the agent more expensive and complicated to prepare.

Thus, there is a need in the art for a thickening composition useful in water-based systems which imparts increased viscosity at low shear rates in water-based systems. There also is a need in the art for a low cost thickener which can be easily utilized in various types of compositions.

SUMMARY OF THE INVENTION

The present invention relates to a thickener composition for water-based systems comprising a clay deposit and modified cellulose.

The invention further comprises a joint compound comprising about 50 to about 99.9% filler, about 0.1 to about 50% binder, about 0.1 to about 50% structure building material and about 0.1 to about 15% thickener composition comprising a clay deposit and modified cellulose.

The invention further relates to a water-based coating composition comprising pigment, latex, extenders, and a thickener composition comprising a clay deposit and modified cellulose.

The invention further relates to a method for preparing a joint compound comprising mixing a clay deposit with a modified cellulose to obtain a mixture, agitating the mixture and then adding a binder, a filler and a structure building material to the mixture.

DETAILED DESCRIPTION OF THE PREFERRED EMBODIMENTS

It has now been discovered that a combination of a clay deposit and a modified cellulosic material, provides thickening in water-based systems and, particularly, in joint compound formulations and water-based coating compositions. This combination is low in cost since the clay may be used without treatment, avoiding the cost of benefication of the clay. In some embodiments, the thickener composition of the invention shows a surprisingly synergistic effect which greatly improves the thickening properties of the clay deposit and modified cellulose over what would be expected from the performance of these compounds individually as thickeners. Even more surprisingly, it has been found that this synergistic effect of some embodiments of the thickener composition is more pronounced in the presence of other components, such as those traditionally used in water-based compositions and joint compound formulations. While not wishing to be bound by any theory, it is believed that the clay deposits are adsorbed significantly onto the surface of the cellulosic material, providing improved thickener properties.

Figure 1:
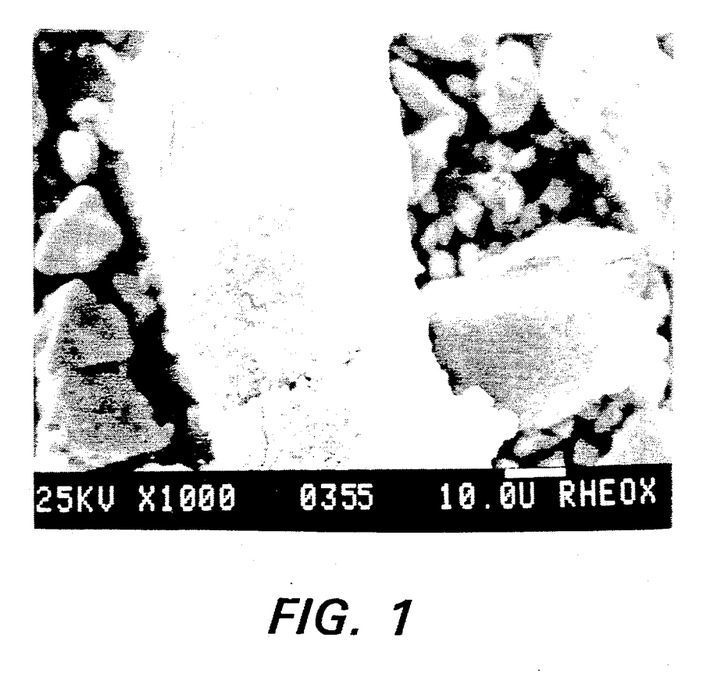
FIG. 1 is a scanning electron micrograph of a hectorite clay deposit and hydroxyethyl cellulose.
Figure 2:
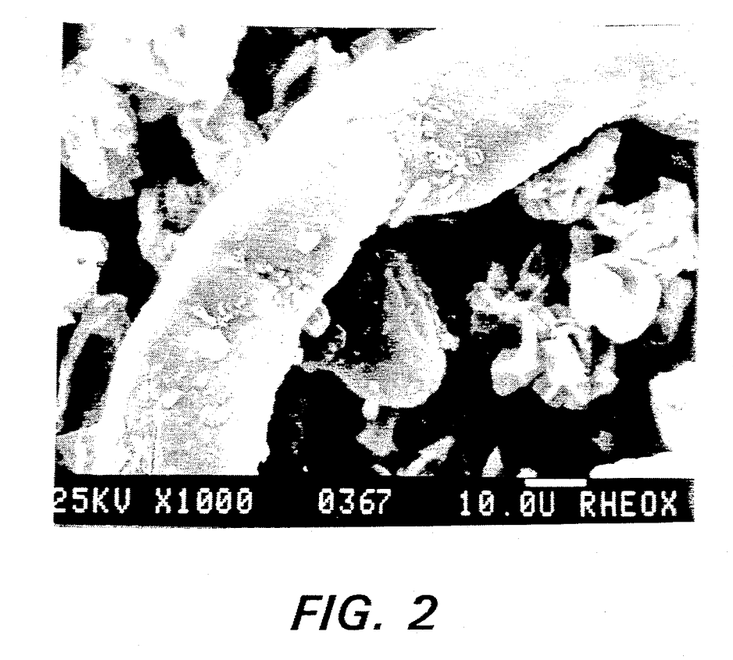
FIG. 2 is a scanning electron micrograph of a purified, beneficiated hectorite clay and hydroxyethyl cellulose.

FIG. 1 is a scanning electron micrograph (SEM) showing a hectorite clay deposit mixed with hydroxyethyl cellulose, a modified cellulosic material. The hectorite deposit appears to be adsorbed onto the cellulosic material. FIG. 2 is a SEM showing beneficiated or treated hectorite clay on the surface of hydroxyethyl cellulose. Very little adsorption of the treated clay is observed in FIG. 2. Thus, it is believed that the combination of clay deposits and modified cellulose results in better thickening at least partly because of the adsorption effect shown in FIG. 1.

The clay deposits to be used in the thickener composition of the invention may be deposits of hectorite, bentonite, montmorillonite, kaolin, illite, saponite, attapulgite, sepiolite or mixtures thereof. These clays are not processed before using, which makes the thickener compositions of the invention economical and efficient to produce. The term clay deposit means a raw material which contains a substantial amount of impurities. Thus, the impurities are not taken out of the clay deposit. Thus, benefication of the clay material is not conducted before use in the thickener compositions of the present invention. In a typical clay refining or beneficiating process, the clay deposit is first put into solution, then centrifuged, separated and dried by drum or spray-drying. A grinding step may also be used to obtain particles of a particular size. Typically, clays sold for use in water-based systems are sold in beneficiated or purified form. However, the clay deposits of this invention are not used in purified form. The clay deposit used in the present invention may be ground to a particular particle size or dried, but these steps are optional. The clay deposits do not have to be processed in any way before use in the thickeners of the present invention.

The clay deposits, such as hectorite deposits, typically contain about 52% pure hectorite or other clay. Surprisingly, these clay minerals provide thickening properties when combined with cellulosic materials which are similar to the thickening properties observed with the use of the same amounts of Bentone LT, a refined hectorite and cellulosic composition wherein the hectorite portion is about 98% hectorite. Hectorite clay deposits are used in a preferred embodiment of the present invention.

The clay deposit will be present in the thickener composition in an amount sufficient to provide the desired rheological properties when combined with modified cellulose. This amount typically can range from about 0.1 to about 99.9% by weight of the total thickener composition. The amount of clay deposit used will depend largely on the end use of the thickener. For use in joint compound, the amount of clay deposit will preferably be about 60 to about 90%. For use in coatings, such as paints, the clay deposit will preferably be present in an amount from about 40 to about 90%. The role of a thickener generally is to impart certain desired rheological properties, aid in pigment dispersion and affect the flow and levellinq of the composition containing the thickener. Considerations which will determine the amount of clay to be used involve the desired viscosity of the water-based composition and its shear thinning behavior for a specific application.

The modified cellulosic material may be any modified cellulose and may be hydrophobic, non-ionic or hydrophilic. Examples of modified cellulosic materials which may be used include hydroxyethyl cellulose, carboxymethyl cellulose, hydroxypropylmethyl cellulose, methylcellulose and sodium carboxymethyl cellulose and hydrophobically modified cellulosic material. The modified cellulosic material used in a preferred embodiment of the thickener composition according to the invention is hydroxyethyl cellulose. The amount of modified cellulose which is to be used in the thickener composition generally will be between about 0.1% to about 99.9%, preferably between about 10 to about 40%. This amount should be sufficient to provide the desired rheological properties when combined with the clay deposit. The amount of modified cellulose which should be used will depend on the end use of the thickener.

The thickener composition of this invention may be used as a rheological additive in water-based systems including paints, varnishes, enamels, waxes, oil drilling fluids, inks, adhesives, sealants, cosmetics, paper coatings, textile backings, bath emulsion systems, cleaners and polishers, detergents, and joint compounds as well as other compositions which desirably contain a thickener composition. The thickener composition of the present invention is employed in an amount sufficient to obtain the desired rheological properties, such as high viscosity at low shear rates, high modulus of elasticity, control of sagging of the fluid system and prevention of settling and hard packing of pigments, extenders and fillers present in the total composition containing the thickener. The thickener composition generally will be used in a water-based system. The amount to be used typically will be about 0.1% to about 15% of the total weight of the system, based on the dry weight. Preferably, the thickener composition will be present in an amount of about 0.3% to about 5% of the total weight, based on the dry solid weight.

In a preferred embodiment, the thickener composition of the invention is used in a joint compound, as explained above. A joint compound formulation generally includes mainly a filler and a binder. Typical fillers are, for example, calcium carbonate or calcium sulfate. The fillers will be present in the joint compound formulation in an amount of about 50 to about 99.9% of the total joint compound formulation based on the dry weight.

The binder is usually polyvinyl alcohol, polyvinyl acetate, latex emulsions, caseins, modified starch, or starch. The binder typically will be present in an amount of about 0.1 to about 50% of the total joint compound formulation. In addition, a structure building material such as mica typically is part of the joint compound formulation. The use of mica and similar materials has been growing since there have been strict restrictions on the use of asbestos which had been used previously as a structure building material in joint compounds. The structure building material is used to provide mechanical strength to the joint compound and generally will be present in an amount of about 0.1 to about 50% of the total joint compound formulation.

These three components, filler, binder and structure building material, constitute between about 50 to about 99.9 percent of the joint compound formulation, based on the dry solid weight. The other ingredients are numerous and vary according to the application. These ingredients may include plasticizers, preservatives, and other additives such as propylene glycol antifreeze, or combinations thereof. These additives will be present in the joint compound in an amount of about 0.1 to about 50% on a dry weight basis. The thickener generally will be present in an amount of about 0.1 to about 15% on a dry weight basis. The components of the joint compound may be mixed dry or in a ready-mix system containing water.

In another preferred embodiment, the thickener composition is used in water-based coating formulations, particularly water-based paints. Such paints typically contain pigment, latex, extenders and water. Various additives may be utilized as well. The materials useful in water-based paint compositions are known to those of skill in the art. For example, the pigment may be titanium dioxide, the latex may be a vinyl-type polymer, and the extenders may include calcium carbonate. Additives which may be useful in a water-based paint formulation include dispersants, surfactants, preservatives, various solvents or pH modifiers. Formulations of these paints are well-known in the art.

The thickener composition is prepared by mixing the clay deposit with the modified cellulose and agitating the mixture. The thickener composition then can be used as a rheological agent in any number of water-based systems. While the individual components of the thickener can be added separately to a water-based system, it has been found that premixing the clay deposit and modified cellulose before addition to a water-based system is highly advantageous and results in higher viscosities, particularly at low shear, as compared to preparing a water-based system with no premixing of the thickener. After the thickener is prepared, other compounds can be added to produce the desired water-based system. For example, a binder, a filler and a structure building compound can be added to form a joint compound composition or a pigment, latex and extender can be added to form a water-based coating composition.

The water-based systems may be prepared by any conventional method including colloid mills, roller mills, ball mills, high and low speed dispersers and various types of mixers or blenders, at room temperature, or lower or higher temperatures.

The following examples are provided to further illustrate the invention, but are not meant to limit the scope of the invention in any way.

EXAMPLES

Example 1

Ten grams of dry hectorite deposit (325 mesh, NL Chemicals) were mixed with 10 grams of dry hydroxyethyl cellulose (HEC) (Natrosol 250H3, Aqualon) and shaken for about 5 minutes. 1, 2, 3, 4, and 5 grams of the mixture were each dispersed in 100 grams deionized water by slowly adding the mixture to water and vigorously mixing with a mechanical stirrer. The viscosity of the solution was studied as a function of shear rate on the Bohlin VOR Rheometer System using C25 Cup in viscometry mode at 25° C.

Example 2

Example 1 was repeated except that 15 grams of hectorite deposit were mixed with 5 grams hydroxyethyl cellulose.

Example 3

Example 1 was repeated except that 5 grams of hectorite deposit were mixed with 15 grams hydroxyethyl cellulose.

Comparative Example 4

Twenty grams of hectorite deposit were used instead of the hectorite deposit/hydroxyethyl cellulose composition in the process illustrated in Example 1.

Comparative Example 5

Twenty grams of hydroxyethyl cellulose were used in the process of Example 1 instead of the hectorite deposit/ hydroxyethyl cellulose composition.

Table 1 shows the viscosity of Examples 1-5 at a shear rate of 0.146 1/S.

TABLE 1

| | | | | | | | |
|---|---|---|---|---|---|---|---|
| Viscosity (Pas) at 0.146 1/S of Hectorite Deposit/Hydroxyethyl Cellulose Compositions in Water | | | | | | | |
| Example | Hectorite Deposit | Hydroxyethyl Cellulose | \multicolumn{5}{c}{Concentration (Wt %)} | | | | |
| | | | 1 | 2 | 3 | 4 | 5 |
| 4 | 100 | — | a | a | a | 0.5 | 1.8 |
| 2 | 75 | 25 | a | 0.6 | 6.3 | 28.9 | 103.5 |
| 1 | 50 | 50 | a | 6.1 | 46.3 | 213.8 | 578.9 |
| 3 | 25 | 75 | 1.7 | 23.5 | 130.8 | 489.1 | 732.9 |
| 5 | — | 100 | 3.5 | 22.8 | 116.8 | 322.6 | 1041.3 |

$^a$Viscosity is below 0.5 Pas.

Figure 3:
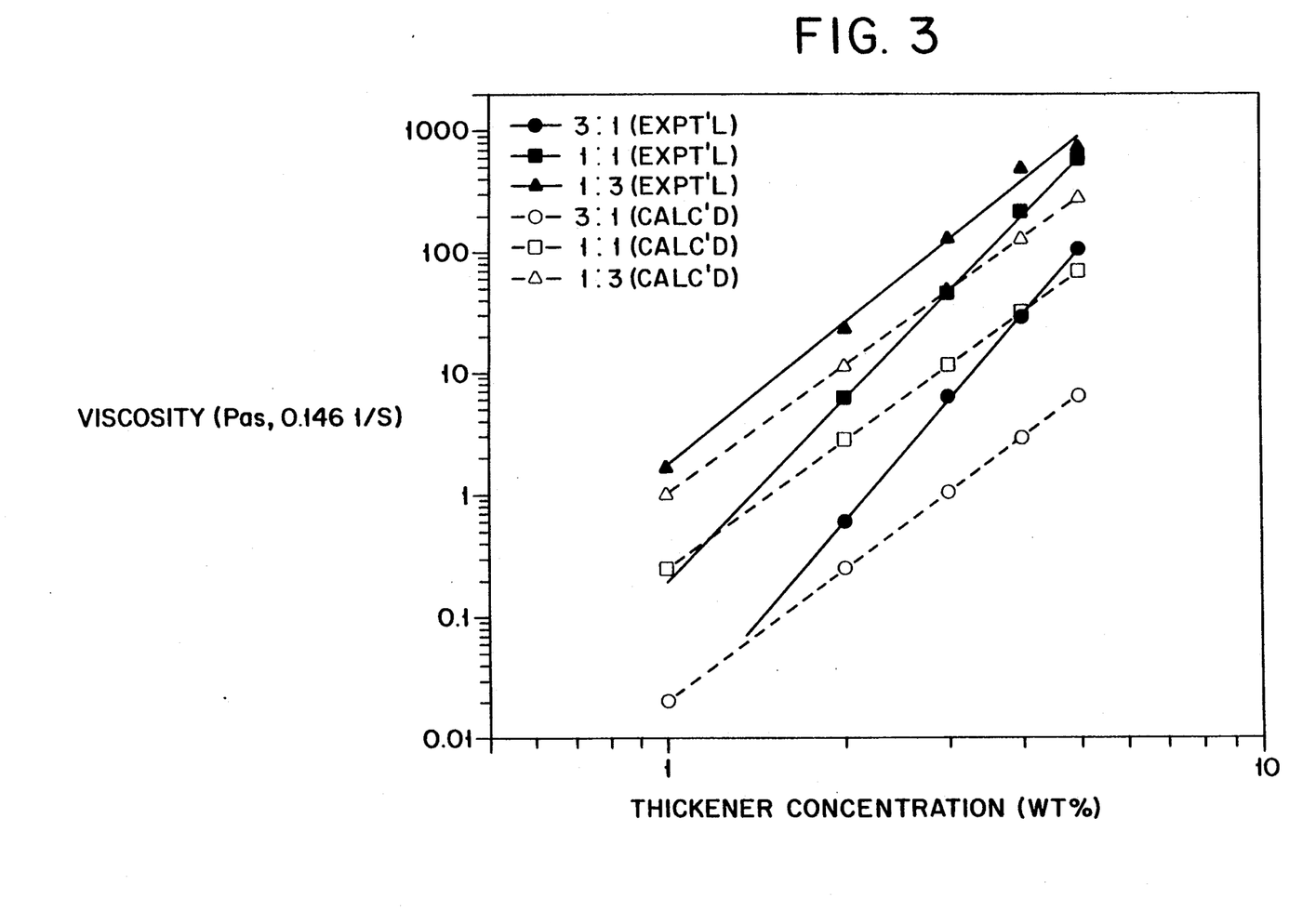
FIG. 3 is a graphical representation of the increase in viscosity as a function of thickener concentration in water.

The increase in viscosity as a function of thickener concentration in water is shown in FIG. 3, which illustrates the calculated viscosity and the experimental viscosity of the combinations described in Examples 1, 2 and 3. It also shows that there is a log-log relationship between the viscosity and the concentration and that the increase in viscosity increases with increased concentration.

Examples 6-14

A joint compound was prepared in powder form according to the following formula:

| Formula No. 1 | |
|---|---|
| Ingredients | Percent of Dry Solids |
| calcium carbonate | 81.5 |
| polyvinyl alcohol | 2.0 |
| mica | 15.0 |
| attapulgite | 1.0 |
| thickener | 0.5 |

The calcium carbonate may be Atomite (ECC America) with an average particle size of 1.8 micron, Gamma Sperse 80 (Georgia Marble) with an average particle size of about 1.2 micron or a similar calcium carbonate. The polyvinyl alcohol (Aldrich or Air Product) may be 100% hydrolyzed or partially hydrolyzed having a variety of molecular weights and molecular weight distributions. Many other binders may be used such as polyvinyl acetate, latex emulsions, starch, modified starch, and caseins, among others.

The mica may be Mica 325 (KMG Minerals) having an average particle size of 10-20 microns.

The attapulgite may be Attagel 50 or Attagel 40 (Engelhard).

The powder was transferred to a Hobart mixer and was mixed for 1 minute at low speed. Water (35% of the total weight) containing Troysan 174 (Troy Chemical) and Cosan 158 (Cosan Chemicals) as preservatives (0.1% each of the total dry weight) was added slowly and the mixture was mixed at high speed for ten minutes.

The following compositions prepared as in Examples 1-5 were added as the thickener in this series, at 0.5% weight concentration (see Formula No. 1). The rheological properties of the joint compounds were measured on the Bohlin VOR Rheometer system using the C14 cup in viscometry mode at 25.20 C. Table 2 shows the thickener composition and the viscosity of the joint compound formulations at low shear rate (0.146 1/S) and high shear rate (146 1/S).

Example 11 illustrates the result when the hectorite deposit and HEC are added to the joint compound without being mixed with each other first. Example 12 is a comparative example using Bentone LT, a composition of about 50% purified hectorite (98% actual hectorite) and 50% HEC. Example 13 is a comparative example using hydroxy propyl methycellulose, a commonly used thickener. Example 14 is a control in which no thickener was used. The percentages next to the amount of hectorite deposit show an approximation of the actual amount of pure hectorite in the hectorite/HEC composition used.

TABLE 2

| | | | | |
|---|---|---|---|---|
| Thickener Composition and Viscosity of Joint Compound Formulations (0.5% wt Thickener) | | | | |
| | \multicolumn{2}{c}{Thickener} | | \multicolumn{2}{c}{Viscosity (Pas)} |
| Example | Hectorite Deposit % | Hydroxyethyl Cellulose % | 0.146 1/S | 146 1/S |
| 6 | 100(52%) | — | 158 | 1.8 |
| 7 | 75(39%) | 25 | 398 | 2.8 |
| 8 | 50(26%) | 50 | 278 | 2.8 |
| 9 | 25(13%) | 75 | 306 | 3.3 |
| 10 | — | 100 | 386 | 3.5 |
| 11 | 75$^a$(39%) | 25$^a$ | 199 | 2.9 |
| 12 | 50$^b$(49%) | 50 | 423 | 4.1 |
| 13 | Hydroxy propyl methylcellulose | | 465 | 3.8 |
| 14 | None | (blank) | 116 | 1.4 |

$^a$Added to joint compound formulation without premixing.
$^b$Treated hectorite (total composition is Bentone LT).

Examples 15-22

Examples 6-13 were repeated, except that the thickener was added as 1% weight of the dry weight.

TABLE 3

| | | | | |
|---|---|---|---|---|
| Thickener Composition and Viscosity of Joint Compound Formulations (1% wt Thickener) | | | | |
| | \multicolumn{2}{c}{Thickener} | | \multicolumn{2}{c}{Viscosity (Pas)} |
| Example | Hectorite Deposit % | Hydroxyethyl Cellulose % | 0.146 1/S | 146 1/S |
| 15 | 100(52%) | — | 293 | 3.0 |
| 16 | 75(39%) | 25 | 770 | 6.7 |
| 17 | 50(26%) | 50 | 687 | 6.3 |
| 18 | 25(13%) | 75 | 689 | 6.2 |
| 19 | — | 100 | 1135 | 10.1 |
| 20 | 75$^a$(39%) | 25$^a$ | 561 | 3.9 |
| 21 | 50$^b$(49%) | 50 | 1188 | 8.6 |
| 22 | Hydroxy propyl methylcellulose | | 1067 | 5.8 |
| 14 | None | (blank) | 116 | 1.4 |

$^a$Added to joint compound formulation without premixing.
$^b$Treated hectorite (total composition is Bentone LT).

Examples 23-31

Examples 23-31 are the same as in Examples 6-14, except that the binder was polyvinyl acetate instead of polyvinyl alcohol. The use of polyvinyl acetate produces thickener samples at high viscosity and is useful for paste-type applications.

TABLE 4

| | | | | |
|---|---|---|---|---|
| Thickener Composition and Viscosity of Joint Compound Formulations (0.5% wt Thickener) | | | | |
| | \multicolumn{2}{c}{Thickener} | | \multicolumn{2}{c}{Viscosity (Pas)} |
| Example | Hectorite Deposit % | Hydroxyethyl Cellulose % | 0.146 1/S | 146 1/S |
| 23 | 100(52%) | — | 817 | 5.2 |
| 24 | 75(39%) | 25 | 1812 | 6.2 |

TABLE 4-continued

Thickener Composition and Viscosity of
Joint Compound Formulations (0.5% wt Thickener)

| Example | Thickener | | Viscosity (Pas) | |
|---|---|---|---|---|
| | Hectorite Deposit % | Hydroxyethyl Cellulose % | 0.146 1/S | 146 1/S |
| 25 | 50(26%) | 50 | 976 | 9.3 |
| 26 | 25(13%) | 75 | 985 | 8.5 |
| 27 | — | 100 | 1348 | 9.9 |
| 28 | 75$^a$(39%) | 25$^a$ | 1086 | 4.6 |
| 29 | 50$^b$(49%) | 50 | 1959 | 8.7 |
| 30 | Hydroxy propyl methylcellulose | | 1044 | 8.3 |
| 31 | None | (blank) | 598 | 2.7 |

$^a$Added to joint compound formulation without premixing.
$^b$Treated hectorite (total composition is Bentone LT).

Examples 32-39

Examples 32-39 are the same as Examples 23-30, except that the thickener loading is 1% wt.

TABLE 5

Thickener Composition and Viscosity of
Joint Compound Formulations (1% wt Thickener)

| Example | Thickener | | Viscosity (Pas) | |
|---|---|---|---|---|
| | Hectorite Deposit % | Hydroxyethyl Cellulose % | 0.146 1/S | 146 1/S |
| 32 | 100(52%) | — | 2045 | 6.1 |
| 33 | 75(39%) | 25 | 3019 | 11.8 |
| 34 | 50(26%) | 50 | 1132 | 9.6 |
| 35 | 25(13%) | 75 | 1280 | 9.9 |
| 36 | — | 100 | 3138 | 14.1 |
| 37 | 75$^a$(39%) | 25$^a$ | 1515 | 7.7 |
| 38 | 50$^b$(49%) | 50 | 3007 | 16.5 |
| 39 | Hydroxy propyl methylcellulose | | 2669 | 11.8 |
| 31 | None | (blank) | 598 | 2.7 |

$^a$Added to joint compound formulation without premixing.
$^b$Treated hectorite (total composition in Bentone LT).

As indicated in these examples, the hectorite deposit compositions show good results when compared with purified hectorite compositions or the traditional thickener, HPMC. It is believed that the hectorite deposit and HEC combines to produce improved thickening. For reasons not clearly understood, the results when 75% hectorite deposit is used are better than when a 50/50 combination is used. It appears from this finding that addition of HEC to the hectorite deposit is not solely responsible for the increased viscosity at low shear since the 25% hectorite deposit/75% HEC and the 75/25 combination both exhibit better thickening than the 50/50 composition. It has been found that use of about 60% to about 90% clay deposit results in the most economical and best thickening properties when used in a joint compound as shown in the examples.

In some formulations, it is advantageous to add hydroxyethyl cellulose to increase the viscosity of the joint compound. The following examples contain 1% (based on dry weight) hydroxy-ethyl cellulose, in addition to the ingredients in Formula No. 1:

| Formula No. 2 | |
|---|---|
| Ingredients | Percent of Dry Solids |
| calcium carbonate | 80.5 |
| polyvinyl alcohol | 2.0 |
| mica | 15.0 |
| attapulgite | 1.0 |
| hydroxyethyl cellulose | 1.0 |
| thickener | 0.5 |

Examples 40-48

Table 6 shows the thickener composition and the viscosity of joint compound formulations containing polyvinl alcohol as the binder and additional 1% wt. hydroxyethyl cellulose.

TABLE 6

Thickener Composition and Viscosity of
Joint Compound Formulations (0.5% wt Thickener)

| Example | Thickener | | Viscosity (Pas) | |
|---|---|---|---|---|
| | Hectorite Deposit % | Hydroxyethyl Cellulose % | 0.146 1/S | 1/S |
| 40 | 100(52%) | — | 1514 | 11.2 |
| 41 | 75(39%) | 25 | 1928 | 11.4 |
| 42 | 50(26%) | 50 | 1941 | 9.5 |
| 43 | 25(13%) | 75 | 1734 | 12.1 |
| 44 | — | 100 | 1965 | 16.4 |
| 45 | 75$^a$(39%) | 25$^a$ | 2068 | 13.8 |
| 46 | 50$^b$(49%) | 50 | 2337 | 14.8 |
| 47 | Hydroxy propyl methylcellulose | | 1889 | 16.1 |
| 48 | None | (blank) | 1207 | 11.8 |

$^a$Added to joint compound formulation without premixing.
$^b$Treated hectorite (total composition is Bentone LT).

Examples 49-56

Examples b 49-56 are the same as Examples 40-47 except that the thickener loading is 1% weight.

TABLE 7

Thickener Composition and Viscosity of
Joint Compound Formulations (1% wt Thickener)

| Example | Thickener | | Viscosity (Pas) | |
|---|---|---|---|---|
| | Hectorite Deposit % | Hydroxyethyl Cellulose % | 0.146 1/S | 146 1/S |
| 49 | 100(52%) | — | 2125 | 11.7 |
| 50 | 75(39%) | 25 | 3165 | 13.8 |
| 51 | 50(26%) | 50 | 2899 | 19.5 |
| 52 | 25(13%) | 75 | 2901 | 17.0 |
| 53 | — | 100 | 2148 | 15.5 |
| 54 | 75$^a$(39%) | 25$^a$ | 2783 | 15.8 |
| 55 | 50$^b$(49%) | 50 | 4796 | 22.4 |
| 56 | Hydroxy propyl methylcellulose | | 3327 | 19.5 |
| 48 | None | (blank) | 1207 | 11.8 |

$^a$Added to joint compound formulation without premixing.
$^b$Treated hectorite (total composition is Bentone LT).

Examples 57-65

Examples 57-65 are the same as examples 40-48, except that the binder is polyvinyl acetate instead of polyvinyl alcohol.

TABLE 8

Thickener Composition and Viscosity of
Joint Compound Formulations (0.5% wt Thickener)

| Example | Thickener | | Viscosity (Pas) | |
|---|---|---|---|---|
| | Hectorite Deposit % | Hydroxyethyl Cellulose % | 0.146 1/S | 146 1/S |
| 57 | 100(52%) | — | 2479 | 11.7 |
| 58 | 75(39%) | 25 | 4148 | 16.2 |
| 59 | 50(26%) | 50 | 4474 | 16.7 |
| 60 | 25(13%) | 75 | 4723 | 17.8 |
| 61 | — | 100 | 5719 | 22.3 |
| 62 | 75$^a$(39%) | 25$a$ | 3359 | 17.2 |
| 63 | 50$^b$(49%) | 50 | 3925 | 18.4 |
| 64 | Hydroxy propyl methylcellulose | | 4520 | 14.2 |
| 65 | None | (blank) | 3100 | 14.5 |

$^a$Added to joint compound formulation without premixing.
$^b$Treated hectorite (total composition is Bentone LT).

Examples 66-73

Examples 66-73 are the same as Examples 57-65, except that the thickener loading is 1% weight.

TABLE 9

Thickener Composition and Viscosity of Joint Compound Formulations (1% wt Thickener)

| Example | Thickener Hectorite Deposit % | Thickener Hydroxyethyl Cellulose % | Viscosity (Pas) 0.146 1/S | Viscosity (Pas) 146 1/S |
|---|---|---|---|---|
| 66 | 100(52%) | — | 3451 | 12.9 |
| 67 | 75(39%) | 25 | 4757 | 18.6 |
| 68 | 50(26%) | 50 | 5807 | 21.0 |
| 69 | 25(13%) | 75 | 7021 | 23.3 |
| 70 | — | 100 | 9798 | 57.7 |
| 71 | 75$^a$(39%) | 25$^a$ | 4016 | 18.2 |
| 72 | 50$^b$(49%) | 50 | 5573 | 25.0 |
| 73 | Hydroxy propyl methylcellulose | | 6696 | 21.3 |
| 65 | None | (blank) | 3100 | 14.5 |

$^a$Added to joint formulation without premixing.
$^b$Treated hectorite (total composition is Bentone LT).

The joint compounds were also tested for drying time, shrinkage and the development of cracks. Samples were weighed in a metal container and allowed to dry. The weight was measured from time to time. There was almost no difference in drying time and the rate of weight loss among the various joint compound compositions.

The development of cracks during the drying process was noted and classified according to the crack type and length. These observations are summarized in Table 10. Shrinkage was measured on the dried samples by applying a new layer of the joint compound and calculating the shrinkage as $$\frac{\text{Weight of the second layer (wet)}}{\text{Sum of the weight of the first and second layers (wet)}}$$

TABLE 10

Crack Development and Shrinkage In Joint Compound Formulations

| Example | Thickener Hectorite Deposit | Thickener Hydroxyethyl Cellulose | % | % Shrinkage | Crack Type$^a$ |
|---|---|---|---|---|---|
| 6 | 100 | — | 0.5 | 21.4 | 1 |
| 7 | 75 | 25 | 0.5 | 21.1 | 2 |
| 8 | 50 | 50 | 0.5 | 21.5 | 3 |
| 9 | 25 | 75 | 0.5 | 21.1 | 3 |
| 10 | — | 100 | 0.5 | 23.1 | 3 |
| 11 | 75$^b$ | 25$^b$ | 0.5 | 20.2 | 2 |
| 12 | 50$^c$ | 50 | 0.5 | 23.0 | 3 |
| 13 | Hydroxypropyl methylcellulose | | 0.5 | 19.9 | 3 |
| 14 | None | (blank) | — | 25.5 | 1 |
| 15 | 100 | — | 1 | 19.4 | 1 |
| 16 | 75 | 25 | 1 | 20.1 | 2 |
| 17 | 50 | 50 | 1 | 20.6 | 3 |
| 18 | 25 | 75 | 1 | 22.8 | 3 |
| 19 | — | 100 | 1 | 24.0 | 3 |
| 20 | 75$^b$ | 25$^b$ | 1 | 21.1 | 2 |
| 21 | 50$^c$ | 50 | 1 | 18.0 | 3 |
| 22 | Hydroxypropyl methylcellulose | | 1 | 17.3 | 3 |
| 23 | 100 | — | 0.5 | 20.3 | 0,6 |
| 24 | 75 | 25 | 0.5 | 22.3 | 0,6 |
| 25 | 50 | 50 | 0.5 | 14.7 | 0,6 |
| 26 | 25 | 75 | 0.5 | 18.0 | 1,6 |
| 27 | — | 100 | 0.5 | 18.0 | 1.6 |
| 28 | 75$^b$ | 25$^b$ | 0.5 | 23.3 | 0,6 |
| 29 | 50$^c$ | 50 | 0.5 | 21.0 | 1,6 |
| 30 | Hydroxypropyl methylcellulose | | 0.5 | 17.3 | 3 |
| 31 | None | (blank) | — | 24.5 | 0,6 |
| 32 | 100 | — | 1 | 20.1 | 0,6 |
| 33 | 75 | 25 | 1 | 22.9 | 1,6 |
| 34 | 50 | 50 | 1 | 16.4 | 1,6 |
| 35 | 25 | 75 | 1 | 15.8 | 2,6 |
| 36 | — | 100 | 1 | 15.3 | 3 |
| 37 | 75$^b$ | 25$^b$ | 1 | 23.3 | 0,6 |
| 38 | 50$^c$ | 50 | 1 | 13.5 | 1,6 |
| 39 | Hydroxypropyl methylcellulose | | 1 | 15.2 | 3 |
| 40 | 100 | — | 0.5 | 20.9 | 4 |
| 41 | 75 | 25 | 0.5 | 18.3 | 4 |
| 42 | 50 | 50 | 0.5 | 18.0 | 4 |
| 43 | 25 | 75 | 0.5 | 20.3 | 4 |
| 44 | — | 100 | 0.5 | 21.0 | 4 |
| 45 | 75$^b$ | 25$^b$ | 0.5 | 19.5 | 4 |
| 46 | 50$^c$ | 50 | 0.5 | 19.0 | 4 |
| 47 | Hydroxypropyl methylcellulose | | 0.5 | 20.6 | 4 |
| 48 | None | (blank) | — | 19.4 | 4 |
| 49 | 100 | — | 1 | 20.4 | 4 |
| 50 | 75 | 25 | 1 | 17.6 | 4 |
| 51 | 50 | 50 | 1 | 18.0 | 4 |
| 52 | 25 | 75 | 1 | 19.7 | 4 |
| 53 | — | 100 | 1 | 20.3 | 4 |
| 54 | 75$^b$ | 25$^b$ | 1 | 19.0 | 4 |
| 55 | 50$^c$ | 50 | 1 | 20.4 | 4 |
| 56 | Hydroxypropyl methylcellulose | | 1 | 19.4 | 4 |
| 57 | 100 | — | 0.5 | 14.5 | 3,6 |
| 58 | 75 | 25 | 0.5 | 14.8 | 3 |
| 59 | 50 | 50 | 0.5 | 16.5 | 3 |
| 60 | 25 | 75 | 0.5 | 15.7 | 4 |
| 61 | — | 100 | 0.5 | 13.4 | 3 |
| 62 | 75$^b$ | 25$^b$ | 0.5 | 21.5 | 3 |
| 63 | 50$^c$ | 50 | 0.5 | 14.3 | 3 |
| 64 | Hydroxypropyl methylcellulose | | 0.5 | 15.2 | 4 |
| 65 | None | (blank) | — | 19.0 | 3 |
| 66 | 100 | — | 1 | 18.3 | 4,6 |
| 67 | 75 | 25 | 1 | 15.0 | 3 |
| 68 | 50 | 50 | 1 | 19.5 | 3 |
| 69 | 25 | 75 | 1 | 16.5 | 4 |
| 70 | — | 100 | 1 | 14.6 | 4 |
| 71 | 75$^b$ | 25$^b$ | 1 | 16.5 | 3 |
| 72 | 50$^c$ | 50 | 1 | 16.4 | 3 |
| 73 | Hydroxypropyl methylcellulose | | 1 | 18.9 | 4 |

$^a$0 - no cracking; 1 - Little cracking; 2 - Few small cracks; 3 - One or two large cracks; 4 - Several large cracks; 5 - Severe cracking; 6 - Crack at the edge of testing device.
$^b$Added to joint compoun formulation without premixing.
$^c$Treated hectorite.

As is clear from Table 10, while HEC is a good thickener by itself, the joint compounds tested show cracking problems not found when hectroite deposit is added to the HEC. The hectorite deposit added to the HEC also maks the thickener more economical than the use of only HEC.

Another possible application of the invention composition is its use as a thickener for water-based paints. A typical water-based paint formulation is shown in Table 11.

TABLE 11

Water Based Paint Formulation

| Ingredient | Commercial Name | Pounds |
|---|---|---|
| Water | | 125.4 |
| Biocide | Nuosept C | 1.0 |
| Dispersant | Tamol 731 | 12.0 |
| Pigment | Titanox 2131 | 209.0 |
| China Clay | Optiwhite | 75.0 |
| Extender | Celite 281 | 35.0 |
| Latex | Ucar 367 | 350.0 |
| Surfactant | Triton N-57 | 2.0 |
| Coalescent | Texanol | 9.0 |
| Propylene Glycol | | 40.0 |
| Defoamer | Colloide 643 | 4.0 |
| Ammonia | | 2.0 |
| Water | | 215.7 |

TABLE 11-continued

| Water Based Paint Formulation | | |
|---|---|---|
| Ingredient | Commercial Name | Pounds |
| | | 1080.1 |

When a composition according to Example No. 1 is incorporated at a level of 6 pounds per hundred gallons of the paint formulation shown in Table 11, the paint exhibits the required rheological properties as known in the art. These properties are summarized in Table 12.

TABLE 12

| | Paint Properties | |
|---|---|---|
| Property | With Thickener | Without Thickener |
| Stormer Viscosity (KU) | 81 | 53 |
| ICI Viscosity | 0.9 | 0.3 |
| Leneta Sag (mils) | 16 | 0 |
| Leneta Level | 5 | 10 |
| Finess of Grind (FOG) | 3.5A | 3.5A |
| Gloss (85° C.) | 2.8 | 5.8 |

From the foregoing description, various modifications and changes in the composition and in the method of using such composition will occur to those skilled in the art. All such modifications or changes coming within the scope of the appended claims are intended to be included therein.

What is claimed is:

1. A thickener composition for water-based systems comprising hectrorite clay depsit and modified cellulose, said hectrorite clay deposit and said modified cellulose being present in an amount effective to thicken the sytems as much as or more than the combined amount of hectrorite in the clay deposit alone, and the cellulose.

2. The thickener composition of claim 1 wherein the modified cellulose is hydroxyethyl cellulose.

3. The thickener composition of claim 2 wherein the hectrorite clay deposit is present in an amount of about 60 to about 90% of the total thickener composition by weight.

4. A joint compound comprising a filler, a binder, a structure building compound and a thicknener composition for water-based systems comprising hectrorite clay deposit and modified cellulose, said hectrorite clay deposit and said modified cellulose being present in an amount effective to thicken the systems as much as or more than the combined amount of hectrorite in the clay deposit alone, and the cellulose 5. The hoint compound of claim 4 wherein the modified cellulose is hydroxyethyl cellulose.

6. The joint compound of claim 5 wherein the hectrorite clay deposit is present in an amount of about 60 to about 90% of the total thickener composition by weight.

7. The joint compound of claim 4 wherein the filler is present in an amount of about 50 to about 99.9%, the binder is present in an amount of about 0.1 to about 50% and the structure building compound is present in an amount of about 0.1 to 50%, by weight, and the thickener composition is present in an amount of about 0.1 to about 15% by weight.

8. The joint compound of claim 7 wherein the filler is calcium carbonate or calcium sulfate.

9. The joint compound of claim 7 wherein the binder is polyvinyl alcohol, polyvinyl acetate, latex emulsion, caseins, modified starch or starch.

10. The joint compound of claim 7 wherein the structure building compound is mica.

11. A ready-mix joint compound comprising water and the joint compound of claim 4.

12. A water-based coating composition comrising pgiment, latex, extenders and a thickener composition for water-based systems comprising hectrorite clay deposit and modified cellulose, said hectrorite clay deposit and said modified cellulose being present in an amount effective to thicken the systems as much as or more than the combined amount of hectrorite in the clay deposit along, and the cellulose.

13. The water-based coating composition of claim 12 wherein the modified cellulose is hydroxyethyl cellulose.

14. The water-based coating composition of claim 13 wherein the hectrorite clay deposit is present in an amount of about 40 to abut 90% of the total thickener composition.

15. A method for preparing a joint water-based compound comprising:
mixing a hectrorite clay deposit and modified cellulose, said hectrorite clay deposit and said modified cellulose being present in an amount effective to thickener the compound as much as or more than the combined amount of hect5orite in the clay deposit alone, and the cellulose, to obtain a mixture;
agitating the mixture; and
addng a binder, a filler and a structure building compound to the mixture.

16. The method of claim 15 wherein the modified cellulose s hydroxyethyl cellulose.

17. The method of claim 16 wherein the hectrorite clay deposit is present in an amount of about 60 to about 90% of the total thicknener by weight.

* * * * *

UNITED STATES PATENT AND TRADEMARK OFFICE
CERTIFICATE OF CORRECTION

PATENT NO. : 5,112,400
DATED : May 12, 1992
INVENTOR(S) : Nae et al

It is certified that error appears in the above-indentified patent and that said Letters Patent is hereby corrected as shown below:

On the title page, item [54] and column 1, line 3, amend "COMPOOUNDS" to --COMPOUNDS--.

Col. 2, line 4, amend "synerqistic" to --synergistic--.

Col. 4, line 55, amend "levellinq" to --leveling--.

Col. 6, line 53, amend "viscomctry" to --viscometry--.

Col. 10, line 5, amend "polyvinl" to --polyvinyl--;
      line 26, delete "b".

Col. 13, line 32, amend "hectrorite" to --hectorite--;
      line 32, amend "depsit" to --deposit--;
      line 33, amend "hectrorite" to --hectorite--;
      line 36, amend "hectrorite" to --hectorite--;
      line 41, amend "hectrorite" to --hectorite--;
      line 45, amend "thicknener" to --thickener--;
      line 46, amend "hectrorite" to --hectorite--;
      line 47, amend "hectrorite" to --hectorite--;
      line 50, amend "hectrorite" to --hectorite--;
      line 51, amend "cellulose" to --cellulose.--; and
      line 52, amend "hoint" to --joint--.

Col. 14, lines 1-2, amend "hectrorite" to --hectorite--;

UNITED STATES PATENT AND TRADEMARK OFFICE
CERTIFICATE OF CORRECTION

PATENT NO. : 5,112,400
DATED : May 12, 1992
INVENTOR(S) : Nae et al

It is certified that error appears in the above-indentified patent and that said Letters Patent is hereby corrected as shown below:

Col. 14, line 21, amend "comrising" to --comprising--;
line 22, amend "pgiment" to --pigment--;
line 23, amend "hectrorite" to --hectorite--;
line 24, amend "hectrorite" to --hectorite--;
line 27, amend "hectrorite" to --hectorite--;
line 28, amend "along" to --alone--;
line 33, amend "hectrorite" to --hectorite--;
line 38, amend "hectrorite" to --hectorite--;
line 39, amend "hectrorite" to --hectorite--;
line 41, amend "thickener" to --thicken--;
line 42, amend "hect5orite" to --hectorite--;
line 49, amend "s" to --is--;
line 50, amend "hectrorite" to --hectorite--; and
line 52, amend "thicknener" to --thickener--.

Signed and Sealed this

Twenty-fifth Day of October, 1994

Attest:

BRUCE LEHMAN

*Attesting Officer*  *Commissioner of Patents and Trademarks*